US012611709B2

(12) United States Patent
Matsumoto et al.

(10) Patent No.: US 12,611,709 B2
(45) Date of Patent: Apr. 28, 2026

(54) POWDER FOR ADDITIVE MANUFACTURING AND METHOD FOR PRODUCING METAL SINTERED BODY

(71) Applicant: SEIKO EPSON CORPORATION, Tokyo (JP)

(72) Inventors: Yasutaka Matsumoto, Suwa (JP); Momoko Wakabayashi, Hachinohe (JP)

(73) Assignee: SEIKO EPSON CORPORATION (JP)

( * ) Notice: Subject to any disclaimer, the term of this patent is extended or adjusted under 35 U.S.C. 154(b) by 76 days.

(21) Appl. No.: 18/160,639

(22) Filed: Jan. 27, 2023

(65) Prior Publication Data

US 2023/0241676 A1 Aug. 3, 2023

(30) Foreign Application Priority Data

Jan. 28, 2022 (JP) ................................ 2022-011726

(51) Int. Cl.

| | |
|---|---|
| ***B22F 1/102*** | (2022.01) |
| ***B22F 10/14*** | (2021.01) |
| ***B22F 10/20*** | (2021.01) |
| ***B22F 10/64*** | (2021.01) |
| ***B33Y 10/00*** | (2015.01) |

(Continued)

(52) U.S. Cl.

CPC .............. *B22F 1/102* (2022.01); *B22F 10/14* (2021.01); *B22F 10/20* (2021.01); *B22F 10/64* (2021.01); *B33Y 10/00* (2014.12); *B33Y 40/20* (2020.01); *B33Y 70/10* (2020.01); *B22F 9/082* (2013.01); *B22F 2301/35* (2013.01); *B22F 2302/45* (2013.01); *B22F 2998/10* (2013.01); *B22F 2999/00* (2013.01)

(58) Field of Classification Search

CPC ...................................................... B22F 1/102

See application file for complete search history.

(56) References Cited

U.S. PATENT DOCUMENTS

| | | | | |
|---|---|---|---|---|
| 6,451,082 B1 * | 9/2002 | Ozaki | ................. | C22C 33/0207 419/65 |
| 2003/0089199 A1 * | 5/2003 | Sano | ......................... | B22F 9/24 75/255 |

(Continued)

FOREIGN PATENT DOCUMENTS

| | | |
|---|---|---|
| CN | 101977711 A | 2/2011 |
| CN | 112548088 A | 3/2021 |

(Continued)

*Primary Examiner* — Sally A Merkling
*Assistant Examiner* — Sean P. O'Keefe
(74) *Attorney, Agent, or Firm* — Harness, Dickey & Pierce, P.L.C.

(57) ABSTRACT

A powder for additive manufacturing, which is a powder for additive manufacturing to be used in a binder jet additive manufacturing method, includes a metal powder, and a coating film that is provided at surfaces of particles of the metal powder and that contains a compound derived from a coupling agent having a reactive functional group, wherein when an average particle diameter is represented by R [μm], and $(R/10)^2/(R/10)^3$ is represented by A, the coating film has a carbon concentration of 0.02 A mass % or more and 0.30 A mass % or less.

5 Claims, 7 Drawing Sheets

(51) Int. Cl.

| | |
|---|---|
| ***B33Y 40/20*** | (2020.01) |
| ***B33Y 70/10*** | (2020.01) |
| *B22F 9/08* | (2006.01) |

(56) References Cited

U.S. PATENT DOCUMENTS

| | | | | |
|---|---|---|---|---|
| 2011/0293940 | A1 | 12/2011 | Tokoro et al. | |
| 2014/0203222 | A1* | 7/2014 | Ito | H01B 1/026<br>252/512 |
| 2017/0327701 | A1* | 11/2017 | Connor | C22C 27/06 |
| 2021/0069785 | A1 | 3/2021 | Nakamura et al. | |
| 2024/0326124 | A1* | 10/2024 | Takada | B22F 1/16 |

FOREIGN PATENT DOCUMENTS

| | | | | |
|---|---|---|---|---|
| JP | S60-244888 | A | | 12/1985 |
| JP | H01-215907 | A | | 8/1989 |
| JP | 2017165796 | A | * | 9/2017 |

* cited by examiner

START

REPEAT REPEATING STEP
UNTIL PREDETERMINED
SHAPE IS OBTAINED

POWDER LAYER FORMING
STEP                                    S102

BINDER SOLUTION
SUPPLYING STEP                          S104

REPEATING STEP                          S106

SINTERING STEP                          S108

END 24
211                    1                    2
                                       212
                                       23
22
                                       21

Z
Y        X

POWDER FOR ADDITIVE MANUFACTURING AND METHOD FOR PRODUCING METAL SINTERED BODY

The present application is based on, and claims priority from JP Application Serial Number 2022-011726, filed Jan. 28, 2022, the disclosure of which is hereby incorporated by reference herein in its entirety.

BACKGROUND

1. Technical Field

The present disclosure relates to a powder for additive manufacturing and a method for producing a metal sintered body.

2. Related Art

As a technique for manufacturing a three-dimensional object, recently, an additive manufacturing method using a metal powder has been becoming widespread. As a technique for manufacturing a three-dimensional object, depending on the solidification principle, a powder sintering additive manufacturing (SLS: Selective Laser Sintering) method, a binder jet method, a fused deposition modeling (FDM) method, etc. are known.

Among them, the binder jet method includes a step of forming a powder layer by leveling a metal powder into the form of a layer using a squeegee or the like, and a step of supplying a binder solution to a part of the powder layer to solidify it, and is a technique for manufacturing a three-dimensional object by repeating these steps. Further, by subjecting the obtained three-dimensional object to a sintering treatment, a metal sintered body having the shape of the three-dimensional object can be produced. According to this method, a metal sintered body having a desired three-dimensional shape can be efficiently obtained without using a mold or the like.

In order to enhance the manufacturing accuracy of the three-dimensional object, it is important to increase the filling factor of the metal powder in the powder layer. By increasing the filling factor, the mechanical strength of the three-dimensional object to be manufactured is increased, and the dimensional accuracy of a metal sintered body to be obtained finally is improved.

As a method for increasing the filling factor of the metal powder, for example, JP-A-60-244888 (Patent Document 1) discloses a method of treating a heavy metal powder with a silane-based surface treatment agent or a titanate-based surface treatment agent. In the disclosure described in Patent Document 1, by hardening such a surface-treated heavy metal powder with a coating resin together with a lubricant, a weight for a self-winding watch with a high specific gravity is realized. By increasing the filling factor of the metal powder, the amount of the coating resin used can be reduced, so as to achieve a high specific gravity of the weight and also improve the mechanical strength.

The surface treatment agent described in Patent Document 1 is intended to improve the mechanical strength after shaping by being used together with a lubricant. Therefore, even if the metal powder to which the surface treatment agent described in Patent Document 1 is applied is diverted to the formation of a powder layer in a binder jet method, the filling factor of the metal powder in the powder layer cannot be sufficiently increased. Further, when it is used together with a lubricant, the mechanical strength of a three-dimensional object manufactured by a binder jet method is increased, but when the obtained three-dimensional object is subjected to a sintering treatment, the volume shrinkage factor increases and the dimensional accuracy decreases.

SUMMARY

Therefore, an object of the present disclosure is to increase the filling factor of a metal powder in a powder layer used in a binder jet method and also increase the mechanical strength of a three-dimensional object while suppressing the amount of a surface treatment agent used.

A powder for additive manufacturing according to an application example of the present disclosure is a powder for additive manufacturing to be used in a binder jet additive manufacturing method, and includes a metal powder and a coating film that is provided at surfaces of particles of the metal powder and that contains a compound derived from a coupling agent having a reactive functional group, wherein when an average particle diameter is represented by R [μm], and $(R/10)^2/(R/10)^3$ is represented by A, the coating film has a carbon concentration of 0.02 A mass % or more and 0.30 A mass % or less.

A method for producing a metal sintered body according to an application example of the present disclosure includes forming a powder layer by spreading the powder for additive manufacturing according to the application example of the present disclosure, obtaining a bound layer by supplying a binder solution containing a binder to the powder layer to bind particles of the powder for additive manufacturing with the binder, obtaining an additively manufactured body by repeating forming the powder layer and obtaining the bound layer one or more times, and obtaining a metal sintered body by subjecting the additively manufactured body to a sintering treatment.

DESCRIPTION OF EXEMPLARY EMBODIMENTS

Hereinafter, preferred embodiments of a powder for additive manufacturing and a method for producing a metal sintered body according to the present disclosure will be described in detail with reference to the accompanying drawings.

1. Method for Producing Metal Sintered Body

First, a method for producing a metal sintered body according to an embodiment will be described.

Figure 1:
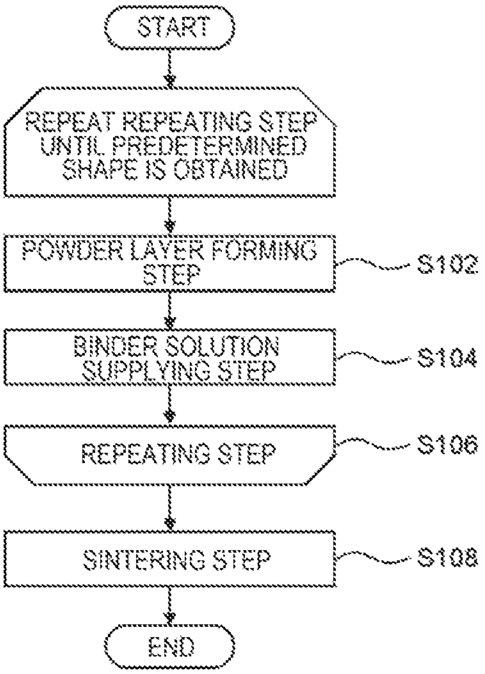
FIG. 1 is a process chart for illustrating a method for producing a metal sintered body according to an embodiment.

FIG. 1 is a process chart for illustrating the method for producing a metal sintered body according to an embodiment. FIGS. 2 to 11 are each a diagram for illustrating the method for producing a metal sintered body shown in FIG. 1. In the respective drawings of the present application, as three axes orthogonal to one another, X axis, Y axis, and Z axis are set. Each axis is represented by an arrow, and the tip side is defined as a "positive side" and the base end side is defined as a "negative side". In the following description, particularly, the positive side of the Z axis is defined as "upper side" and the negative side of the Z axis is defined as "lower side". Further, both directions parallel to the X axis are referred to as X-axis direction, both directions parallel to the Y axis are referred to as Y-axis direction, and both directions parallel to the Z axis are referred to as Z-axis direction.

The method for producing a metal sintered body shown in FIGS. 1 to 11 includes a process for obtaining an additively manufactured body by a method called a binder jet method. The method for producing a metal sintered body shown in FIG. 1 includes a powder layer forming step S102, a binder solution supplying step S104, a repeating step S106, and a sintering step S108.

In the powder layer forming step S102, a powder layer 31 is formed by spreading a powder for additive manufacturing 1 according to an embodiment described below. In the binder solution supplying step S104, a binder solution 4 is supplied to a predetermined region of the powder layer 31 to bind particles in the powder layer 31, thereby obtaining a bound layer 41. In the repeating step S106, the powder layer forming step S102 and the binder solution supplying step S104 are repeated one or more times, thereby obtaining an additively manufactured body 6 shown in FIG. 10. In the sintering step S108, the additively manufactured body 6 is subjected to a sintering treatment, thereby obtaining a metal sintered body 10. Hereinafter, the respective steps will be sequentially described.

1.1. Additive Manufacturing Apparatus

First, prior to the description of the powder layer forming step S102, an additive manufacturing apparatus 2 will be described.

The additive manufacturing apparatus 2 includes an apparatus body 21 having a powder storage portion 211 and a manufacturing portion 212, a powder supply elevator 22 provided in the powder storage portion 211, a manufacturing stage 23 provided in the manufacturing portion 212, and a coater 24, a roller 25, and a liquid supply portion 26, each of which is provided movably on the apparatus body 21.

The powder storage portion 211 is provided in the apparatus body 21, and is a recess portion with an open top. In the powder storage portion 211, a powder for additive manufacturing 1 is stored. Then, an appropriate amount of the powder for additive manufacturing 1 stored in the powder storage portion 211 is supplied to the manufacturing portion 212 by the coater 24.

At a bottom of the powder storage portion 211, the powder supply elevator 22 is disposed. The powder supply elevator 22 is configured to be movable in the vertical direction in a state where the powder for additive manufacturing 1 is placed thereon. By moving the powder supply elevator 22 upward, the powder for additive manufacturing 1 placed on the powder supply elevator 22 is pushed up so as to protrude from the powder storage portion 211. According to this, the protruding portion of the powder for additive manufacturing 1 can be moved to the manufacturing portion 212 side.

The manufacturing portion 212 is provided in the apparatus body 21, and is a recess portion with an open top. In the inside of the manufacturing portion 212, the manufacturing stage 23 is disposed. On the manufacturing stage 23, the powder for additive manufacturing 1 is spread in the form of a layer with the coater 24. Further, the manufacturing stage 23 is configured to be movable in the vertical direction in a state where the powder for additive manufacturing 1 is spread thereon. By appropriately set the height of the manufacturing stage 23, the amount of the powder for additive manufacturing 1 spread on the manufacturing stage 23 can be adjusted.

The coater 24 and the roller 25 are configured to be movable in the X-axis direction from the powder storage portion 211 to the manufacturing portion 212. The coater 24 levels the powder for additive manufacturing 1 by dragging the powder for additive manufacturing 1 and can spread it in the form of a layer. The roller 25 compresses the leveled powder for additive manufacturing 1 from above.

The liquid supply portion 26 is, for example, constituted by an inkjet head, a dispenser, or the like, and is configured to be movable in the X-axis direction and the Y-axis direction in the manufacturing portion 212. Then, the liquid supply portion 26 can supply a desired amount of a binder solution 4 to a desired position. The liquid supply portion 26 may include a plurality of ejection nozzles in one head. Then, it may be configured to eject the binder solution 4 from the plurality of ejection nozzles simultaneously or with a time difference.

1.2. Powder Layer Forming Step

Figure 2:
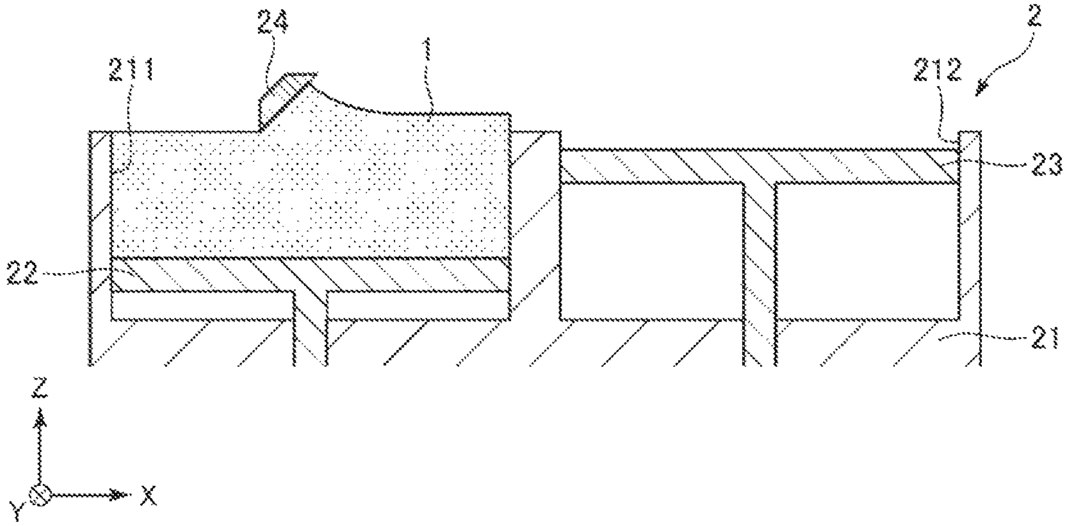
FIG. 2 is a diagram for illustrating the method for producing a metal sintered body shown in FIG. 1.
Figure 3:
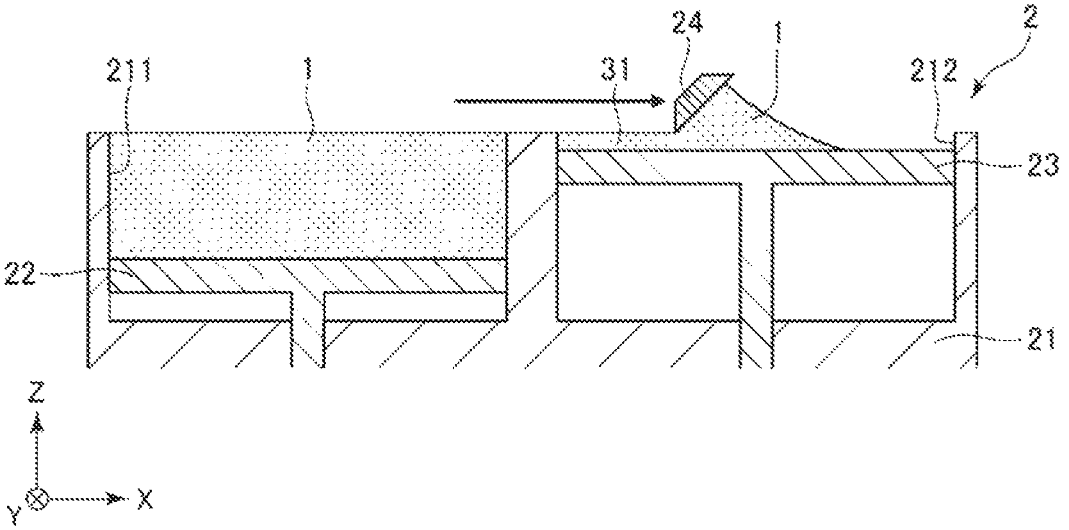
FIG. 3 is a diagram for illustrating the method for producing a metal sintered body shown in FIG. 1.
Figure 4:
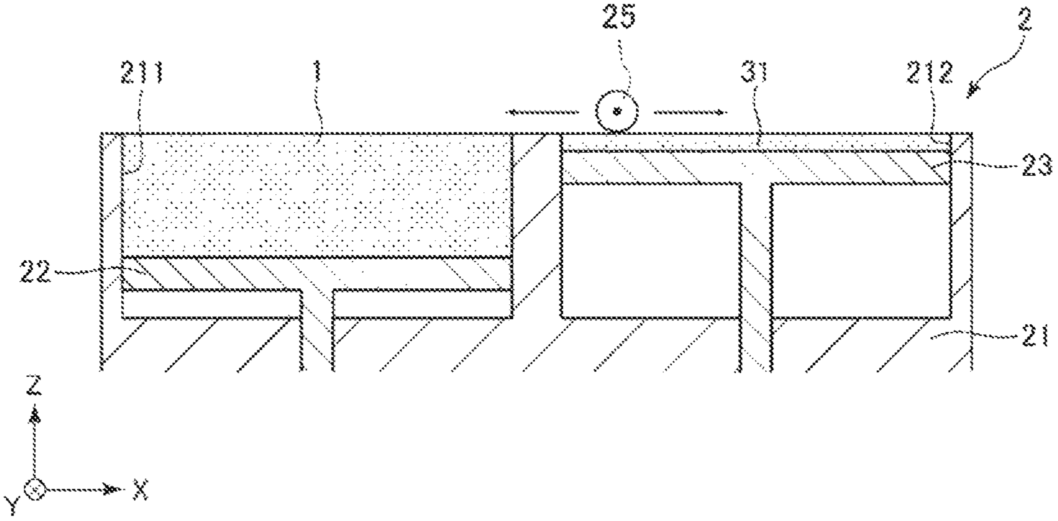
FIG. 4 is a diagram for illustrating the method for producing a metal sintered body shown in FIG. 1.

Next, the powder layer forming step S102 using the above-mentioned additive manufacturing apparatus 2 will be described. In the powder layer forming step S102, the powder layer 31 is formed by spreading the powder for additive manufacturing 1 on the manufacturing stage 23. Specifically, as shown in FIGS. 2 and 3, by using the coater 24, the powder for additive manufacturing 1 stored in the powder storage portion 211 is dragged onto the manufacturing stage 23 and leveled to a uniform thickness. By doing this, the powder layer 31 shown in FIG. 4 is obtained. At that time, the thickness of the powder layer 31 can be adjusted by lowering the upper face of the manufacturing stage 23 below the upper end of the manufacturing portion 212 and adjusting the lowering amount. The powder for additive manufacturing 1 is a powder having excellent fillability when it is leveled as described later. Therefore, the powder layer 31 having a high filling factor can be obtained.

Subsequently, the roller 25 is moved in the X-axis direction while compressing the powder layer 31 in the thickness direction with the roller 25. By doing this, the filling factor of the powder for additive manufacturing 1 in the powder layer 31 can be increased. The compression with the roller 25 may be performed as needed, and may be omitted. Alternatively, the powder layer 31 may be compressed by a unit different from the roller 25, for example, a pressing plate or the like.

1.3. Binder Solution Supplying Step

Figure 5:
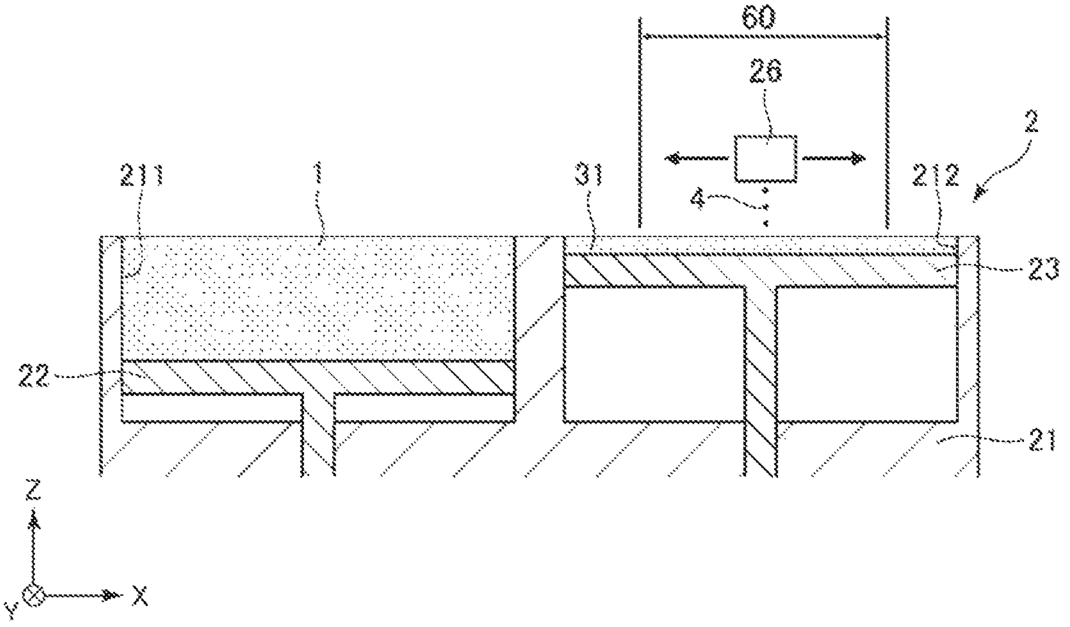
FIG. 5 is a diagram for illustrating the method for producing a metal sintered body shown in FIG. 1.

In the binder solution supplying step S104, as shown in FIG. 5, the binder solution 4 is supplied to a forming region 60 corresponding to the additively manufactured body 6 to be manufactured in the powder layer 31 by the liquid supply portion 26. The binder solution 4 is a liquid containing a binder and a solvent or a dispersion medium. In the forming region 60 to which the binder solution 4 is supplied, particles of the powder for additive manufacturing 1 are bound to one another, thereby obtaining the bound layer 41 shown in FIG. 6. In the bound layer 41, the particles of the powder for additive manufacturing 1 are bound to one another by the binder, and therefore, the layer has shape retainability to such an extent that it is not collapsed by its own weight.

The bound layer 41 may be heated simultaneously with or after the supply of the binder solution 4. According to this, volatilization of the solvent or the dispersion medium contained in the binder solution 4 is promoted, and also the binding of the particles by solidification or hardening of the binder is promoted. When the binder contains a photocurable resin or an ultraviolet curable resin, light irradiation or ultraviolet irradiation may be performed instead of heating or together with heating.

The heating temperature when performing heating is not particularly limited, but is preferably 50° C. or higher and 250° C. or lower, and more preferably 70° C. or higher and 200° C. or lower. According to this, when the powder for additive manufacturing 1 that was not bound by the binder solution 4 is reused, it is possible to suppress the occurrence of denaturation in the powder for additive manufacturing 1 due to heating.

The binder solution 4 is not particularly limited as long as it is a liquid containing a component capable of binding the particles of the powder for additive manufacturing 1. Examples of the solvent or the dispersion medium contained in the binder solution 4 include water, alcohols, ketones, and carboxylic acid esters, and it may be a mixed liquid containing at least one type among these. Further, examples of the binder contained in the binder solution 4 include a fatty acid, a paraffin wax, a microcrystalline wax, polyethylene, polypropylene, polystyrene, an acrylic resin, a polyamide resin, polyester, stearic acid, polyvinylpyrrolidone (PVP), polyvinyl alcohol (PVA), polyethylene glycol (PEG), a urethane-based resin, an epoxy-based resin, a vinyl-based resin, an unsaturated polyester-based resin, and a phenolic resin.

1.4. Repeating Step

Figure 10:
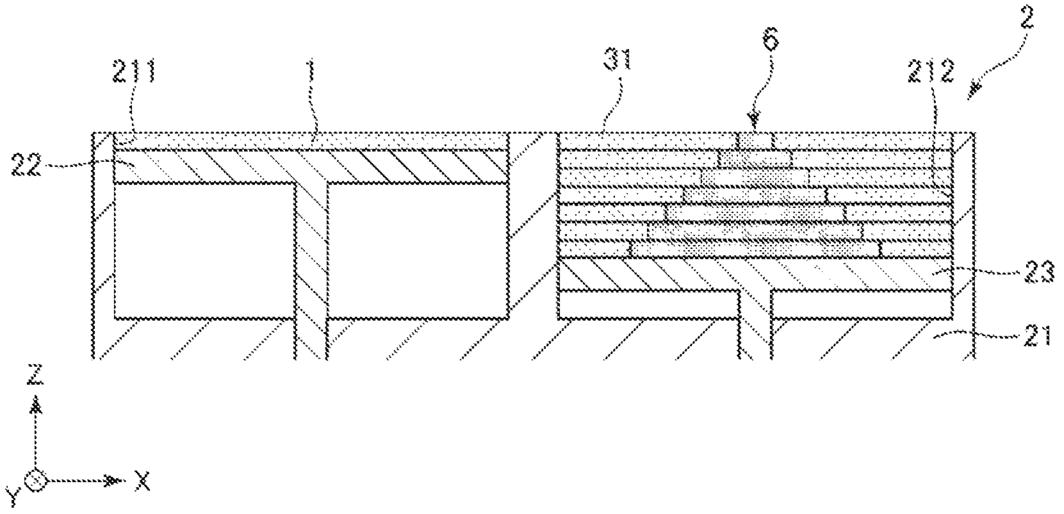
FIG. 10 is a diagram for illustrating the method for producing a metal sintered body shown in FIG. 1.

In the repeating step S106, the powder layer forming step S102 and the binder solution supplying step S104 are repeated one or more times until a stacked body obtained by stacking a plurality of bound layers 41 has a predetermined shape. That is, these steps are performed a total of two or more times. According to this, the three-dimensional additively manufactured body 6 as shown in FIG. 10 is obtained.

Figure 6:
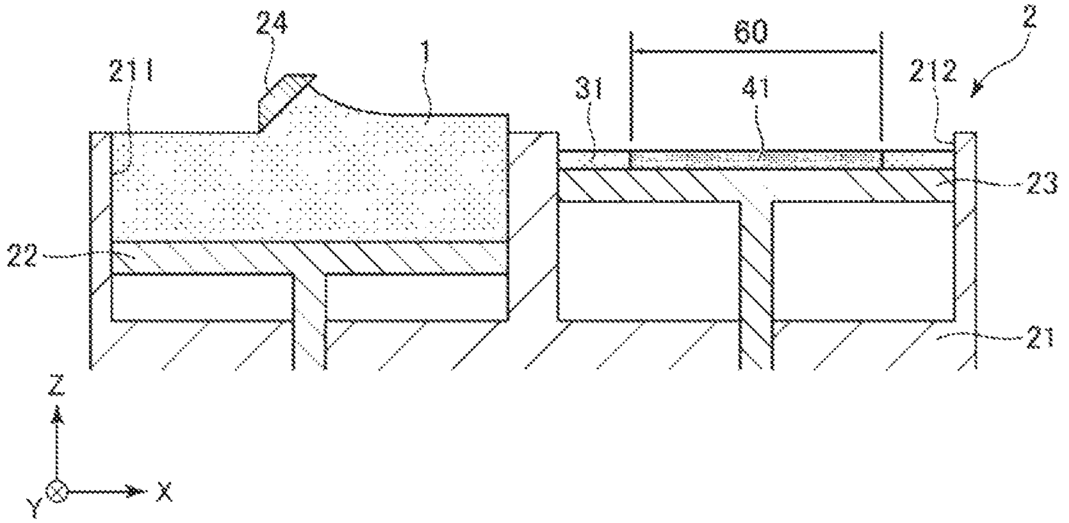
FIG. 6 is a diagram for illustrating the method for producing a metal sintered body shown in FIG. 1.
Figure 7:
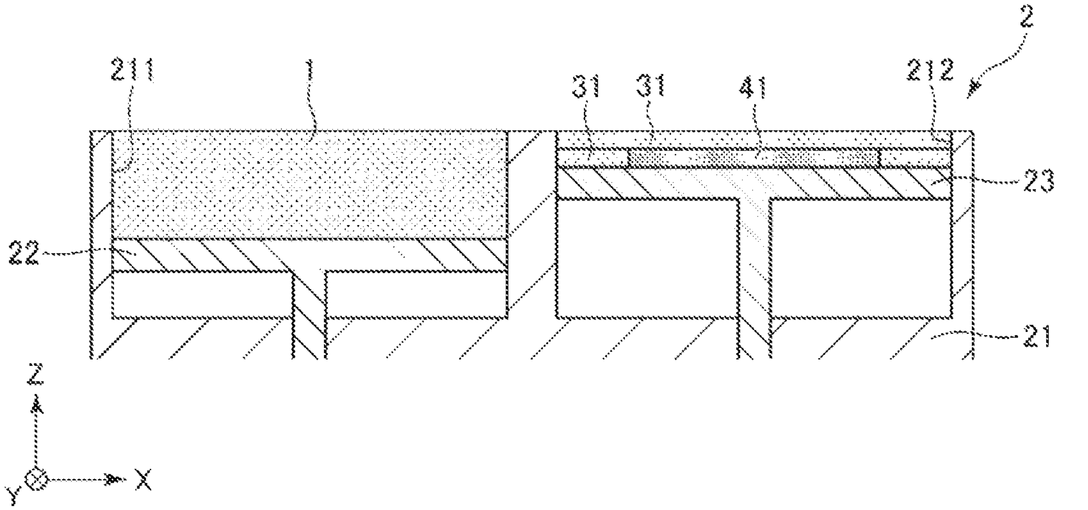
FIG. 7 is a diagram for illustrating the method for producing a metal sintered body shown in FIG. 1.
Figure 8:
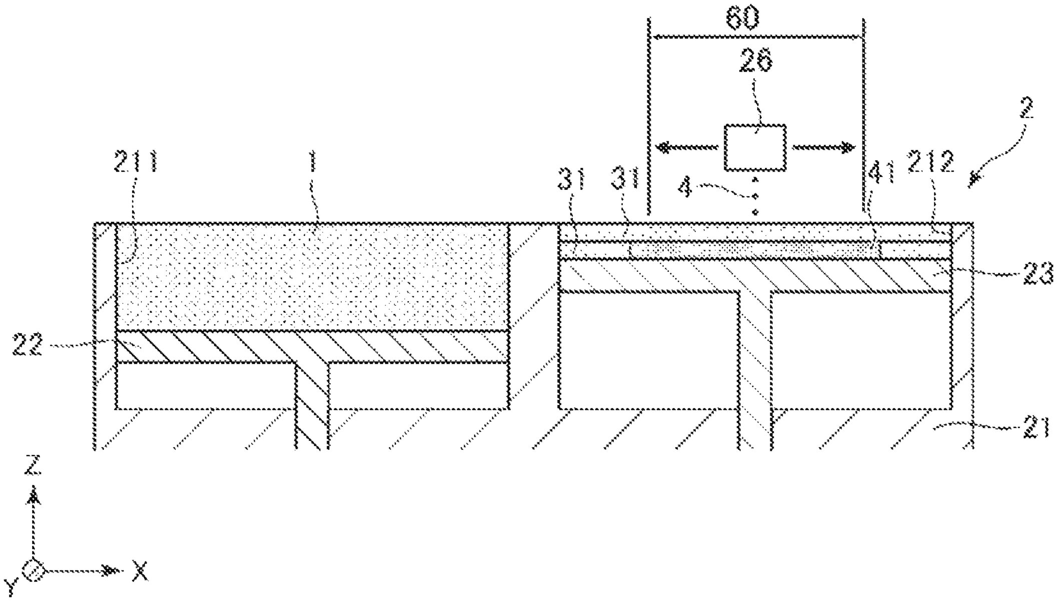
FIG. 8 is a diagram for illustrating the method for producing a metal sintered body shown in FIG. 1.
Figure 9:
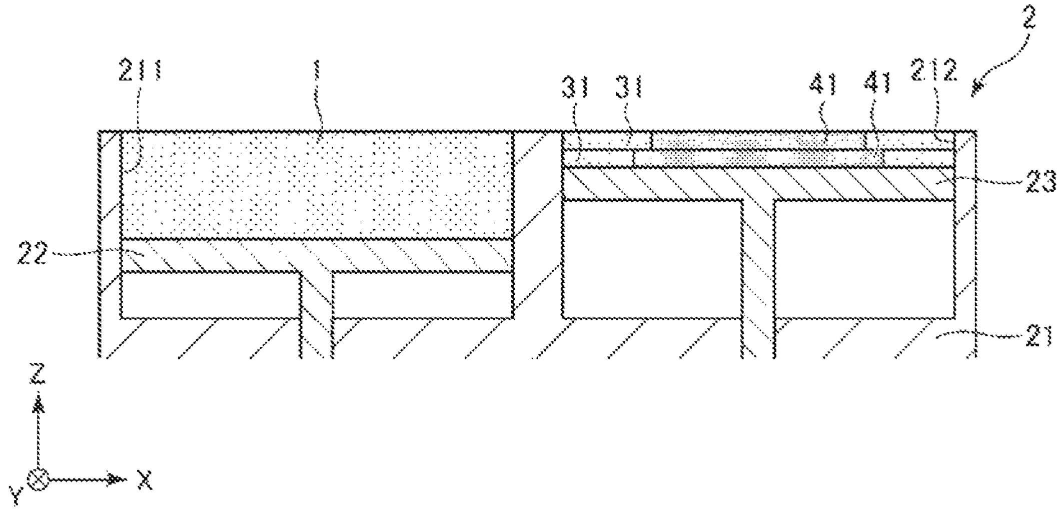
FIG. 9 is a diagram for illustrating the method for producing a metal sintered body shown in FIG. 1.

Specifically, first, on the bound layer 41 shown in FIG. 6, a new powder layer 31 is formed as shown in FIG. 7. Subsequently, as shown in FIG. 8, the binder solution 4 is supplied to the forming region 60 in the newly formed powder layer 31. By doing this, the bound layer 41 shown in FIG. 9 is obtained. By repeating these operations, the additively manufactured body 6 shown in FIG. 10 is obtained.

In the powder layer 31, the powder for additive manufacturing 1 that did not form the bound layer 41 is collected and reused as needed.

Further, the obtained additively manufactured body 6 may be subjected to calcination as needed. According to this, at least a part of the binder contained in the additively manufactured body 6 is removed, and the abundance ratio of the metal particles can be increased. As a result, the shrinkage factor in the below-mentioned sintering step S108 can be decreased, and unintended deformation or the like of the obtained metal sintered body 10 can be suppressed.

The calcination temperature is not particularly limited as long as it is such a temperature that at least a part of the binder is volatilized and the metal powder is not sintered, but is preferably 100° C. or higher and 500° C. or lower, and more preferably 150° C. or higher and 300° C. or lower. Further, the calcination time is preferably 5 minutes or more, more preferably 10 minutes or more and 120 minutes or less, and even more preferably 20 minutes or more and 60 minutes or less within the above-mentioned temperature range. As the atmosphere in the calcination, for example, an air atmosphere, an inert atmosphere such as nitrogen or argon, a reduced pressure atmosphere obtained by reducing the pressure of such an atmosphere, or the like is exemplified.

1.5. Sintering Step

Figure 11:
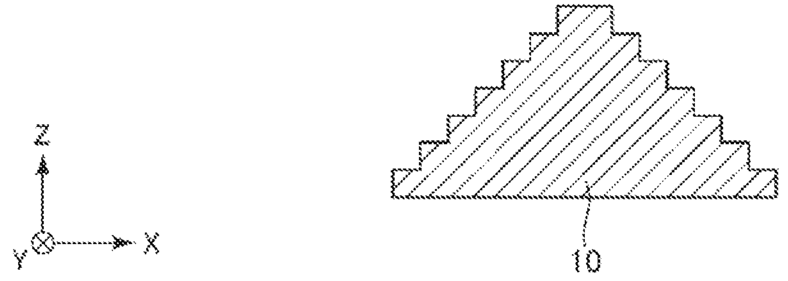
FIG. 11 is a diagram for illustrating the method for producing a metal sintered body shown in FIG. 1.

In the sintering step S108, the additively manufactured body 6 is subjected to a sintering treatment. In the sintering treatment, the additively manufactured body 6 is heated to cause a sintering reaction. By doing this, the metal sintered body 10 shown in FIG. 11 is obtained.

The sintering temperature varies depending on the type of powder for additive manufacturing 1, the particle diameter thereof, or the like, but is preferably 980° C. or higher and 1330° C. or lower, and more preferably 1050° C. or higher and 1260° C. or lower in one example. Further, the sintering time is preferably 0.2 hours or more and 7 hours or less, and more preferably 1 hour or more and 6 hours or less.

As the atmosphere in the sintering treatment, for example, a reducing atmosphere such as hydrogen, an inert atmosphere such as nitrogen or argon, a reduced pressure atmosphere obtained by reducing the pressure of such an atmosphere, or the like is exemplified. The pressure of the reduced pressure atmosphere is not particularly limited as long as it is less than normal pressure (100 kPa), but is preferably 10 kPa or less, and more preferably 1 kPa or less.

The metal sintered body 10 obtained as described above can be used, for example, as a material constituting the whole or a part of a component for transport equipment such as a component for automobiles, a component for bicycles, a component for railroad cars, a component for ships, a component for airplanes, or a component for space transport equipment, a component for electronic apparatus such as a component for personal computers, a component for cellular phone terminals, a component for tablet terminals, or a component for wearable terminals, a component for electrical apparatus such as a refrigerator, a washing machine, and a cooling and heating machine, a component for machines such as a machine tool and a semiconductor production apparatus, a component for plants such as an atomic power plant, a thermal power plant, a hydroelectric power plant, an oil refinery plant, and a chemical complex, or an ornament such as a component for timepieces, metallic tableware, jewels, and a frame for glasses.

2. Powder for Additive Manufacturing

Next, the powder for additive manufacturing according to an embodiment will be described.

Figure 12:
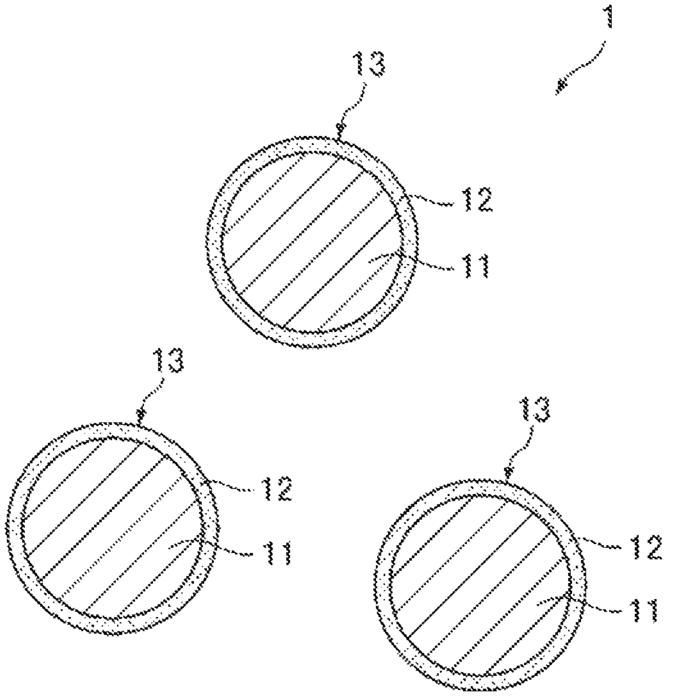
FIG. 12 is a cross-sectional view schematically showing a powder for additive manufacturing according to an embodiment.

FIG. 12 is a cross-sectional view schematically showing a powder for additive manufacturing according to an embodiment.

The powder for additive manufacturing 1 according to an embodiment is a powder to be used in a binder jet additive manufacturing method.

As shown in FIG. 12, the powder for additive manufacturing 1 is an assembly of surface-coated particles 13 each including a metal particle 11 and a coating film 12 provided at the surface of the metal particle 11. The coating film 12 contains a compound derived from a coupling agent having a reactive functional group. Then, when an average particle diameter of the powder for additive manufacturing 1 is represented by R [μm], and $(R/10)^2/(R/10)^3$ is represented by A, in the powder for additive manufacturing 1, a carbon concentration in the coating film 12 is 0.02 A mass % or more and 0.30 A mass % or less.

In such a powder for additive manufacturing 1, the amount of the used coupling agent with respect to the metal particles 11 is optimized. According to this, insufficient or excessive use of the coupling agent can be avoided, so that the filling factor of the metal particles 11 in the powder layer 31 can be increased. As a result, the additively manufactured body 6 obtained by additive manufacturing using a binder jet method and a calcined body thereof with high shape retainability and a high mechanical strength can be produced. In this specification, an assembly of the metal particles 11 is also referred to as "metal powder".

2.1. Metal Particle

The constituent material of the metal particle 11 is not particularly limited, and may be any material as long as it is a metal material having sinterability. As an example, a simple substance such as Fe, Ni, Co, or Ti, or an alloy, an intermetallic compound, or the like containing such a simple substance as a main component is exemplified.

As an Fe-based alloy, for example, stainless steel such as austenitic stainless steel, martensitic stainless steel, or precipitation hardening stainless steel, low carbon steel, carbon steel, heat-resistant steel, die steel, high-speed tool steel, an Fe—Ni alloy, an Fe—Ni—Co alloy, or the like is exemplified.

As a Ni-based alloy, for example, a Ni—Cr—Fe-based alloy, a Ni—Cr—Mo-based alloy, a Ni—Fe-based alloy, or the like is exemplified.

As a Co-based alloy, for example, a Co—Cr-based alloy, a Co—Cr—Mo-based alloy, a Co—Al—W-based alloy, or the like is exemplified.

As a Ti-based alloy, for example, an alloy of Ti with a metal element such as Al, V, Nb, Zr, Ta, or Mo is exemplified, and specifically, Ti-6Al-4V, Ti-6Al-7Nb, or the like is exemplified.

2.2. Coating Film

The coating film 12 is formed by allowing a coupling agent having a reactive functional group to react with the surface of the metal particle 11. Therefore, the coating film 12 contains a compound derived from the coupling agent having a reactive functional group and has a property derived from the reactive functional group.

The coupling agent used for forming the coating film 12 is a compound having a hydrolyzable group and a reactive functional group. Examples of such a coupling agent include a silane coupling agent, a titanium coupling agent, a zirconium coupling agent, and an aluminum coupling agent.

The following chemical formula is an example of the molecular structure of a silane coupling agent.

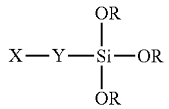

In the above formula, X is a reactive functional group, Y is a spacer, and OR is a hydrolyzable group. R is, for example, a methyl group, an ethyl group, or the like.

The hydrolyzable group may be, for example, a halogen group or the like other than an alkoxy group represented by the above formula, but is preferably an alkoxy group. The hydrolyzable group generates a silanol by hydrolysis. This silanol reacts with a hydroxy group generated at the surface of the metal particle 11, so that the coupling agent adheres to the surface of the metal particle 11.

As such a hydrolyzable group, at least one hydrolyzable group may be contained in the coupling agent, but it is preferred to contain two or more hydrolyzable groups, and it is more preferred to contain three hydrolyzable groups as in the above formula. The coupling agent containing a plurality of hydrolyzable groups reacts with a plurality of hydroxy groups generated at the surface of the metal particle 11. Due to this, the coating film 12 derived from the coupling agent has particularly favorable adhesion to the metal particle 11. Therefore, the compound derived from the coupling agent contained in the coating film 12 refers to a compound obtained by a reaction of a hydrolysable group with a hydroxy group. Further, the coupling agent containing three hydrolyzable groups also has excellent film formability, and therefore, the coating film 12 with excellent continuity can be obtained. Such a coating film 12 contributes to particular enhancement of the fillability of the powder for additive manufacturing 1.

The reactive functional group is a functional group with high reactivity. The reactive functional group contributes to the enhancement of the affinity between the coating film 12 and the binder by utilizing this high reactivity. Therefore, by containing the compound derived from the coupling agent having a reactive functional group, the coating film 12 exhibits a high binding strength with the binder. As a result, the mechanical strength of the additively manufactured body 6 and a calcined body thereof can be increased, and further, the shape retainability thereof can be enhanced.

Examples of the reactive functional group include a phenyl group, a vinyl group, an epoxy group, an amino group, a methacrylic group, and a mercapto group. Among these, the reactive functional group is preferably a phenyl group, a vinyl group, an epoxy group, or an amino group. These exhibit a binding reaction to a resin that can serve as a binder. Therefore, by using the coupling agent having such a reactive functional group, the powder for additive manufacturing 1 with sufficiently high fillability can be obtained even if the used amount thereof is suppressed.

Examples of the coupling agent having a phenyl group include phenyltrimethoxysilane, phenyltriethoxysilane, dimethoxydiphenylsilane, diethoxydiphenylsilane, 2,2-dimethoxy-1-phenyl-1-aza-2-silacyclopentane, and N-phenyl-3-aminopropyltrimethoxysilane.

Examples of the coupling agent having a vinyl group include vinyltris(β-methoxyethoxy) silane, vinyltrimethoxysilane, and vinyltriethoxysilane.

Examples of the coupling agent having an epoxy group include 3-glycidoxypropyltrimethoxysilane, 3-glycidoxypropyltriethoxysilane, 3-glycidoxypropylmethyldimethoxysilane, and 3-glycidoxypropylmethyldiethoxysilane.

Examples of the coupling agent having an amino group include 3-aminopropyltrimethoxysilane, 3-aminopropyltriethoxysilane, 3-aminopropylmethyldimethoxysilane, 3-aminopropylmethyldiethoxysilane, 2-aminoethyl-3-aminopropyltrimethoxysilane, 2-aminoethyl-3-aminopropyltriethoxysilane, and 2-aminoethyl-3-aminopropylmethyldimethoxysilane.

Examples of the coupling agent having a methacrylic group include 3-methacryloxypropyltrimethoxysilane, 3-methacryloxypropylmethyldimethoxysilane, 3-methacryloxypropylmethyldiethoxysilane, and 3-methacryloxypropyltriethoxysilane.

Examples of the coupling agent having a mercapto group include γ-mercaptopropyltrimethoxysilane and γ-chloropropyltrimethoxysilane.

The average thickness of the coating film 12 is not particularly limited, but is preferably 100 nm or less, more preferably 0.5 nm or more and 50 nm or less, and even more preferably 1 nm or more and 10 nm or less. According to this, the film thickness necessary for maintaining the coating film 12 and sufficiently obtaining the above-mentioned effect can be ensured.

The average thickness of the coating film 12 is the average value of the film thickness measured at 10 or more sites by observing the cross section of one particle of the powder for additive manufacturing 1 with an electron microscope.

The coating film 12 may be a multilayer film in which a plurality of layers are superimposed, but is preferably a monomolecular film of the compound described above. In the coating film 12, which is a monomolecular film, its thickness can be minimized, and the compound described above is densely present in the coating film 12, and therefore, even if the average thickness of the coating film 12 is small, the above-mentioned effect is sufficiently obtained. As a result, an additively manufactured body in which the forming accuracy is particularly high and the filling factor of the metal particles 11 is particularly high is obtained.

The monomolecular film is a film formed by self-assembly of the coupling agent. In the monomolecular film, the molecules of the coupling agent having affinity are densely arranged at the surface of the metal particle 11, so that a film with a thickness of one molecule is formed with high continuity. Therefore, even if the coating film 12 is thin, a favorable effect is obtained.

2.3. Carbon Concentration

As described above, the carbon concentration in the coating film 12 is optimized based on the average particle diameter R of the powder for additive manufacturing 1. Specifically, when $(R/10)^2/(R/10)^3$ is represented by A, the carbon concentration in the coating film 12 is 0.02 A mass % or more and 0.30 A mass % or less. As a result of extensive studies by the present inventor, it was found that the carbon concentration in the coating film 12 is closely related to the concentration of the reactive functional group in the coating film 12. Then, it was found that the carbon concentration in the coating film 12 can be a parameter indicating excess or insufficiency of the effect of the coating film 12. Accordingly, in the present embodiment, by optimizing the carbon concentration in the coating film 12, the powder for additive manufacturing 1 that can avoid insufficient or excessive use of the coupling agent is realized.

When the carbon concentration in the coating film 12 is within the above range, the amount of the coupling agent used is set without excess or insufficiency regardless of the type of coupling agent or the average particle diameter R, and therefore, the filling factor of the metal particles 11 in the powder layer 31 can be increased. As a result, the generation of a void in the additively manufactured body 6 obtained by additive manufacturing using a binder jet method is suppressed, and the mechanical strength of the additively manufactured body 6 and a calcined body thereof can be increased.

The carbon concentration in the coating film 12 can be further optimized according to the type of reactive functional group included in the coupling agent.

When the reactive functional group is a phenyl group, the carbon concentration is preferably 0.07 A mass % or more and 0.30 A mass % or less, more preferably 0.09 A mass % or more and 0.20 A mass % or less, and even more preferably 0.10 A mass % or more and 0.16 A mass % or less. According to this, the carbon concentration in the coating film 12 can be particularly optimized in consideration of the affinity between the phenyl group and the binder. As a result, in the powder layer 31 formed using the powder for additive manufacturing 1 in which the reactive functional group is a phenyl group, the fillability of the metal particles 11 can be particularly enhanced.

In addition, when the reactive functional group is a phenyl group, and the carbon concentration is 0.07 A mass % or more and 0.30 A mass % or less, the binder contained in the binder solution 4 preferably contains a vinyl-based resin, an unsaturated polyester-based resin, or a phenolic resin.

The coupling agent having a phenyl group exhibits high binding affinity for the binder containing a resin as described above. Examples of a binding reaction include a π-CH reaction for a vinyl-based resin and an unsaturated polyester-based resin, and a π-π reaction for a phenolic resin. By such a reaction, the coating film 12 and the binder can be bound to each other through a compound derived from the coupling agent. Note that the π-CH reaction refers to a reaction (CH/π interaction) that produces an attractive force between a π-electron system such as a benzene ring and a CH bond (a bond between a carbon atom and a hydrogen atom). Further, the π-π reaction refers to a reaction (π/π interaction) that produces an attractive force between π-electron systems such as benzene rings.

When the reactive functional group is a vinyl group, the carbon concentration is preferably 0.02 A mass % or more and 0.10 A mass % or less, and more preferably 0.04 A mass % or more and 0.08 A mass % or less. According to this, the carbon concentration in the coating film 12 can be particularly optimized in consideration of the affinity between the vinyl group and the binder. As a result, in the powder layer 31 formed using the powder for additive manufacturing 1 in which the reactive functional group is a vinyl group, the fillability of the metal particles 11 can be particularly enhanced.

In addition, when the reactive functional group is a vinyl group, and the carbon concentration is 0.02 A mass % or more and 0.10 A mass % or less, the binder contained in the binder solution 4 preferably contains a vinyl-based resin or an unsaturated polyester-based resin.

The coupling agent having a vinyl group exhibits high binding affinity for the binder containing a resin as described above. Examples of a binding reaction include a grafting reaction with the above-mentioned resin. By such a reaction, a compound derived from the coupling agent is grafted as a side chain of the binder, and the coating film 12 and the binder can be bound to each other.

Examples of the vinyl-based resin include polyvinyl alcohol, polyvinyl acetate, polyvinyl butyral, polyvinyl acetal, and polyvinylpyrrolidone, and among them, one type or a mixture of two or more types is used.

Examples of the unsaturated polyester-based resin include an unsaturated polyester polymer obtained by reacting an acid component including an α,β-unsaturated dicarboxylic acid with an alcohol. Examples of the α,β-unsaturated dicarboxylic acid include maleic acid, fumaric acid, itaconic acid, citraconic acid, aconitic acid, tetrahydrophthalic acid, dihydromuconic acid, or derivatives thereof such as acid anhydrides thereof, and among them, one type or a mixture of two or more types is used.

When the reactive functional group is an epoxy group, the carbon concentration is preferably 0.07 A mass % or more and 0.30 A mass % or less, more preferably 0.09 A mass % or more and 0.20 A mass % or less, and even more preferably 0.10 A mass % or more and 0.16 A mass % or less. According to this, the carbon concentration in the coating film 12 can be particularly optimized in consideration of the affinity between the epoxy group and the binder. As a result, in the powder layer 31 formed using the powder for additive manufacturing 1 in which the reactive functional group is an epoxy group, the fillability of the metal particles 11 can be particularly enhanced.

In addition, when the reactive functional group is an epoxy group, and the carbon concentration is 0.07 A mass % or more and 0.30 A mass % or less, the binder contained in the binder solution 4 preferably contains a urethane-based resin, an epoxy-based resin, an unsaturated polyester-based resin, or a phenolic resin.

The coupling agent having an epoxy group exhibits high binding affinity for the binder containing a resin as described above. Examples of a binding reaction include an epoxy ring opening reaction for the above-mentioned resin. By such a reaction, the coating film 12 and the binder can be bound to each other through a compound derived from the coupling agent.

The urethane-based resin is not particularly limited as long as it is a resin which is a polymer having a urethane bond, and is produced by a condensation reaction of a compound having an isocyanate group and a compound having a hydroxy group. Examples of the urethane-based resin include a thermoplastic polyurethane resin (polyurethane-based thermoplastic elastomer), and a thermosetting polyurethane resin.

The epoxy-based resin is not particularly limited as long as it is a compound having two or more epoxy groups in one molecule, and examples thereof include a bisphenol A-type epoxy resin, a bisphenol F-type epoxy resin, and an alicyclic epoxy resin, and among them, one type or a mixture of two or more types is used.

Examples of the phenolic resin include a novolac-type phenolic resin and a resol-type phenolic resin. Further, it may be a modified phenolic resin such as an alkylphenol-modified phenolic resin, a polyvinyl butyral-modified phenolic resin, or a rubber-modified phenolic resin.

When the reactive functional group is an amino group, the carbon concentration is preferably 0.03 A mass % or more and 0.14 A mass % or less, more preferably 0.05 A mass % or more and 0.12 A mass % or less, and even more preferably 0.06 A mass % or more and 0.11 A mass % or less. According to this, the carbon concentration in the coating film 12 can be particularly optimized in consideration of the affinity between the amino group and the binder. As a result, in the powder layer 31 formed using the powder for additive manufacturing 1 in which the reactive functional group is an amino group, the fillability of the metal particles 11 can be particularly enhanced.

In addition, when the reactive functional group is an amino group, and the carbon concentration is 0.03 A mass % or more and 0.14 A mass % or less, the binder contained in the binder solution 4 preferably contains a urethane-based resin, an epoxy-based resin, or a phenolic resin.

The coupling agent having an amino group exhibits high binding affinity for the binder containing a resin as described above. Examples of a binding reaction include a ureidation reaction for a urethane-based resin, an epoxy ring opening reaction for an epoxy-based resin, and hydrogen bonding for a phenolic resin. By such a reaction, the coating film 12 and the binder can be bound to each other through a compound derived from the coupling agent.

The carbon concentration in the coating film 12 is obtained as follows.

First, with respect to the powder for additive manufacturing 1, the carbon concentration is measured by a method according to an infrared absorption method after combustion in an oxygen stream (combustion in a high-frequency induction heating furnace) specified in JIS G 1211:2011. In this method, $CO_2$ or CO generated by heating the powder for additive manufacturing 1 in an oxygen stream is detected, and a $CO_2$ concentration or a CO concentration is measured. Subsequently, from the obtained $CO_2$ concentration and CO concentration, the carbon concentration is calculated. Subsequently, from the calculation result, the carbon concentration in the metal particles 11 is subtracted. The carbon concentration after subtraction is defined as the carbon concentration in the coating film 12. The carbon concentration in the metal particles 11 is a measurement value obtained by subjecting the powder for additive manufacturing 1 to an ozone treatment or an oxygen plasma treatment to remove the coating film 12, and then performing measurement in the same manner as described above for the particles after the treatment. Whether the coating film 12 could be removed is determined by subjecting the particles after the treatment to an elemental analysis by X-ray photoelectron spectroscopy, and determining whether the carbon amount on the particle surface is almost zero (0.01 mass % or less). As a measurement device conforming to the above-mentioned JIS standard, for example, a carbon-sulfur analyzer, CS-200 manufactured by LECO Corporation is exemplified.

2.4. Powder Properties

The average particle diameter R [μm] of the powder for additive manufacturing 1 is preferably 3.0 μm or more and 30.0 μm or less, more preferably 4.0 μm or more and 15.0 μm or less, and even more preferably 5.0 μm or more and 10.0 μm or less.

By setting the average particle diameter of the powder for additive manufacturing 1 within the above range, the fillability of the powder layer 31 can be particularly enhanced. According to this, the additively manufactured body 6 and a calcined body thereof, in which the shape accuracy is high and also the filling factor of the metal particles 11 is high are obtained. As a result, the metal sintered body 10 in which the accuracy in the target shape is high and the mechanical strength is particularly high is obtained. Further, the metal sintered body 10 having a small surface roughness and an excellent surface smoothness is obtained.

The average particle diameter R of the powder for additive manufacturing 1 is a particle diameter when the cumulative frequency from the small diameter side reaches 50% in a volume-based cumulative particle size distribution obtained with a laser diffraction-type particle size distribution analyzer.

Further, in the powder for additive manufacturing 1 according to the present embodiment, it is preferred that with respect to the true density of the metal powder, the bulk density is 41% or more and 48% or less, and the tap density is 55% or more and 65% or less. Such a powder for additive manufacturing 1 exhibits particularly high fillability when the powder layer 31 is formed. It is considered that the bulk density mainly contributes to the fillability of the powder for additive manufacturing 1 before it is subjected to the above-mentioned powder layer forming step S102. In addition, it is considered that the tap density mainly contributes to the fillability when it is leveled with the coater 24 in the powder layer forming step S102. By optimizing both, the powder layer 31 having particularly high fillability can be obtained, and the additively manufactured body 6 and a calcined body thereof having high forming accuracy and a high mechanical strength can be produced.

The ratio of the bulk density of the powder for additive manufacturing 1 to the true density of the metal powder is preferably 41% or more and 48% or less as described above, but is more preferably 42% or more and 47% or less and even more preferably 43% or more and 46% or less.

The ratio of the tap density of the powder for additive manufacturing 1 to the true density of the metal powder is preferably 55% or more and 65% or less as described above, but is more preferably 57% or more and 64% or less and even more preferably 58% or more and 63% or less.

The ratio of the bulk density and the ratio of the tap density may exceed the above-mentioned upper limit, but there is a possibility that it may be sensitively susceptible to the effect of temperature or humidity, and therefore it is preferred to keep them not more than the above-mentioned upper limit.

The true density of the metal powder is a true density of the constituent material of the metal particles 11. The bulk density of the powder for additive manufacturing 1 is measured by the method of Metallic powders—Determination of apparent density specified in JIS Z 2504:2012. The tap density of the powder for additive manufacturing 1 is measured by a powder property evaluation device, Powder Tester (registered trademark) PT-X manufactured by Hosokawa Micron Corporation.

2.5. Effect of Embodiment

As described above, the powder for additive manufacturing 1 according to the embodiment is a powder to be used in a binder jet additive manufacturing method, and includes a metal powder, and the coating film 12 that is provided at the surfaces of particles of the metal powder (the surfaces of the metal particles 11) and that contains a compound derived from a coupling agent having a reactive functional group. Then, when the average particle diameter of the powder for additive manufacturing 1 is represented by R [μm], and $(R/10)^2/(R/10)^3$ is represented by A, the carbon concentration in the coating film 12 is 0.02 A mass % or more and 0.30 A mass % or less.

In the powder for additive manufacturing 1 having such a configuration, the amount of the coupling agent used with respect to the metal particles 11 is optimized. According to this, insufficient or excessive use of the coupling agent can be avoided, so that the filling factor of the metal particles 11 in the powder layer 31 can be increased. As a result, the mechanical strength of the additively manufactured body 6 obtained by additive manufacturing using a binder jet method can be increased. That is, the additively manufactured body 6 in which the shape retainability is high and deformation or cracking is less likely to occur can be produced. Further, a calcined body obtained by calcinating such an additively manufactured body 6 also has a high mechanical strength and high shape retainability. As a result, a metal sintered body obtained by sintering thereof has high accuracy in the target shape and also has a high mechanical strength.

Further, when the additively manufactured body 6 is calcined in an air atmosphere at a temperature of 200° C. for 30 minutes, the bending strength of the obtained calcined body is preferably 0.4 MPa (40 $N/cm^2$) or more, and more preferably 0.5 MPa (50 $N/cm^2$) or more.

When the bending strength of the calcined body is within the above range, the shape retainability of the calcined body can be sufficiently enhanced. That is, a calcined body with less deformation, cracking, or the like is obtained. By sintering such a calcined body, it is possible to obtain the metal sintered body 10 in which the accuracy in the target shape is high and also the mechanical strength is high.

Further, the method for producing a metal sintered body according to the embodiment includes the powder layer forming step S102, the binder solution supplying step S104, the repeating step S106, and the sintering step S108.

In the powder layer forming step S102, the powder layer 31 is formed by spreading the powder for additive manufacturing 1. In the binder solution supplying step S104, the binder solution 4 containing a binder is supplied to the powder layer 31 to bind particles of the powder for additive manufacturing 1 with the binder, thereby obtaining the bound layer 41. In the repeating step S106, the powder layer forming step S102 and the binder solution supplying step S104 are repeated one or more times, thereby obtaining the additively manufactured body 6. In the sintering step S108, the additively manufactured body 6 is subjected to a sintering treatment, thereby obtaining the metal sintered body 10.

As described above, the powder for additive manufacturing 1 is a powder having excellent fillability when it is leveled in the form of a layer with a coater or the like while suppressing the amount of the used coupling agent serving as a surface treatment agent. Therefore, an additively manufactured body obtained by additive manufacturing using a binder jet method has excellent shape retainability and denseness. Accordingly, when the additively manufactured body is calcined, a calcined body having a good mechanical strength and shape retainability can be obtained. Therefore, with the use of the method for producing a metal sintered body according to the present embodiment, the metal sintered body 10 in which the accuracy in the target shape is high and also the mechanical strength is high can be efficiently produced.

3. Method for Producing Powder for Additive Manufacturing

Next, a method for producing a powder for additive manufacturing according to an embodiment will be described.

Figure 13:
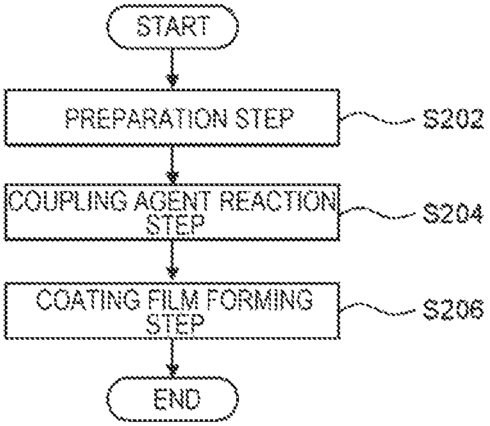
FIG. 13 is a process chart for illustrating a method for producing a powder for additive manufacturing according to an embodiment.

FIG. 13 is a process chart for illustrating the method for producing a powder for additive manufacturing according to the embodiment.

The method for producing a powder for additive manufacturing shown in FIG. 13 includes a preparation step S202, a coupling agent reaction step S204, and a coating film forming step S206.

3.1. Preparation Step

In the preparation step S202, the metal particles 11 are prepared. The metal particles 11 may be produced by any method, but are preferably a powder produced by an atomization method such as a water atomization method, a gas atomization method, or a spinning water atomization method, and more preferably a powder produced by a water atomization method or a spinning water atomization method. In the metal particles 11 produced by such a method, the surfaces thereof are likely to be covered with a hydroxy group derived from water. Therefore, the adhesion of the coating film 12 to the metal particles 11 can be enhanced, so that even if the coating film 12 is thin, the fillability of the surface-coated particles 13 can be sufficiently enhanced. As a result, the additively manufactured body 6 and a calcined body in which the occupation ratio of the metal particles 11 is higher than that of the coating film 12 and the shrinkage factor during sintering is small can be realized.

The metal powder may be subjected to a known pretreatment for generating a hydroxy group at the surface of the metal particle 11 as needed. Examples of the pretreatment include an ozone treatment, an oxygen plasma treatment, a corona treatment, an arc treatment, and an ultraviolet irradiation treatment.

3.2. Coupling Agent Reaction Step

In the coupling agent reaction step S204, a coupling agent having a reactive functional group is allowed to react with a metal powder. By doing this, the coupling agent is adhered to the surface of the metal particle 11.

Examples of the operation include an operation of placing both the metal particles 11 and the coupling agent in a chamber and then heating the inside of the chamber, an operation of placing the metal particles 11 in a chamber and then spraying the coupling agent into the chamber while stirring the metal particles 11, and an operation of adding water, the coupling agent, and an alkaline solution of ammonia, sodium hydroxide, or the like to a primary alcohol such as methanol, ethanol, or isopropyl alcohol, and performing stirring, filtering, and then drying.

The amount of the coupling agent added is not particularly limited, but is preferably 0.01 mass % or more and 1.00 mass % or less, and more preferably 0.05 mass % or more and 0.50 mass % or less with respect to the metal particles 11. Further, the coupling agent is supplied into the chamber by a method such as standing or spraying.

3.3. Coating Film Forming Step

In the coating film forming step S206, the metal particles 11 to which the coupling agent is adhered are heated. By doing this, the coating film 12 is formed at the surfaces of the metal particles 11, and the powder for additive manufacturing 1 is obtained. Further, the unreacted coupling agent can be removed by heating.

The heating temperature for the metal particles 11 to which the coupling agent is adhered is not particularly limited, but is preferably 50° C. or higher and 300° C. or lower, and more preferably 100° C. or higher and 250° C. or lower. The heating time is preferably 10 minutes or more and 24 hours or less, and more preferably 30 minutes or more and 10 hours or less. Examples of an atmosphere in the heating treatment include an air atmosphere and an inert gas atmosphere.

Hereinabove, the powder for additive manufacturing and the method for producing a metal sintered body according to the present disclosure have been described with reference to the embodiments illustrated in the drawings, however, the present disclosure is not limited thereto, and for example, the powder for additive manufacturing according to the present disclosure may be configured to add any component to the above-mentioned embodiment. Further, the method for producing a metal sintered body according to the present disclosure may be configured to add any desired step to the above-mentioned embodiment.

EXAMPLES

Next, specific Examples of the present disclosure will be described.

4. Production of Powder for Additive Manufacturing

4.1. Sample No. 1

First, a powder (metal powder) of precipitation hardening stainless steel 17-4PH produced by a water atomization method was prepared. Then, the obtained metal powder was directly used as a powder for additive manufacturing of Sample No. 1.

4.2. Sample No. 2

First, a powder (metal powder) of precipitation hardening stainless steel 17-4PH produced by a water atomization method was prepared. Then, 100 g of the prepared metal powder was subjected to a pretreatment. Subsequently, after a solution in which a coupling agent and water were mixed was prepared, the solution was sprayed onto the metal powder heated to 200° C. by spray coating. Thereafter, the metal powder sprayed with the solution was dried as it was. By doing this, a powder for additive manufacturing in which a coating film was formed at the surfaces of the particles of the metal powder was obtained. The amount of the coupling agent used was set to an amount equivalent to 0.1 mass % of the metal powder. Further, the true density of the metal powder was 7.78 $g/cm^3$.

In Table 1, the reactive functional group and the hydrolyzable group included in the coupling agent are shown. Further, the carbon concentration in the coating film is shown in Table 1 in the form of a multiple of the value of A and in the form of a numerical value obtained by calculating the value of A.

4.3. Sample Nos. 3 to 15

Powders for additive manufacturing were obtained in the same manner as in the case of Sample No. 2 except that the production conditions of the powder for additive manufacturing were changed as shown in Table 1. Note that the symbols attached to the column of the substance name shown in Table 1 correspond to the following substance names.

a-1: phenyltrimethoxysilane
a-2: phenyltriethoxysilane
a-3: dimethoxydiphenylsilane
x-1: methyltrimethoxysilane 4.4. Sample Nos. 16 to 24

Powders for additive manufacturing were obtained in the same manner as in the case of Sample No. 2 except that the production conditions of the powder for additive manufacturing were changed as shown in Table 2. Note that the symbols attached to the column of the substance name shown in Table 2 correspond to the following substance names.

b-1: vinyltrimethoxysilane
b-2: vinyltriethoxysilane
x-1: methyltrimethoxysilane 4.5. Sample Nos. 25 to 36

Powders for additive manufacturing were obtained in the same manner as in the case of Sample No. 2 except that the production conditions of the powder for additive manufacturing were changed as shown in Table 3. Note that the symbols attached to the column of the substance name shown in Table 3 correspond to the following substance names.

c-1:3-glycidoxypropyltrimethoxysilane
c-2:3-glycidoxypropyltriethoxysilane
x-1: methyltrimethoxysilane 4.6. Sample Nos. 37 to 45

Powders for additive manufacturing were obtained in the same manner as in the case of Sample No. 2 except that the production conditions of the powder for additive manufacturing were changed as shown in Table 4. Note that the symbols attached to the column of the substance name shown in Table 4 correspond to the following substance names.

d-1:3-aminopropyltrimethoxysilane
d-2:3-aminopropyltriethoxysilane
x-1: methyltrimethoxysilane In Tables 1 to 4, the powder for additive manufacturing of Sample No. corresponding to the present disclosure is denoted by "Example", and the powder for additive manufacturing of Sample No. not corresponding to the present disclosure is denoted by "Comparative Example".

5. Evaluation of Powder for Additive Manufacturing and Calcined Body 5.1. Bulk Density of Powder for Additive Manufacturing With respect to the powders for additive manufacturing of respective Sample Nos., the bulk density was measured by the method of Metallic powders-Determination of apparent density specified in JIS Z 2504:2012. Then, the ratio of the measured bulk density to the true density of the metal powder was calculated. The measurement results and the calculation results are shown in Tables 1 to 4.

5.2. Tap Density of Powder for Additive Manufacturing

With respect to the powders for additive manufacturing of respective Sample Nos., the tap density was measured using a powder property evaluation device, Powder Tester (registered trademark) PT-X manufactured by Hosokawa Micron Corporation. The number of taps was set to 125. Then, the ratio of the measured tap density to the true density of the metal powder was calculated. The measurement results and the calculation results are shown in Tables 1 to 4.

5.3. Production and Evaluation of Calcined Body 5.3.1. Production of Calcined Body By using the powders for additive manufacturing of respective Sample Nos., additively manufactured bodies with a rectangular parallelepiped shape were produced by a binder jet method. The size of each of the produced additively manufactured bodies was 33 mm in length, 12 mm in width, and 6.6 mm in thickness. As the binder solution, a solution containing a binder shown in any of Tables 1 to 4 was used.

Subsequently, the produced additively manufactured bodies were calcined. The calcination temperature was set to 200° C., the calcination time was set to 30 minutes, and as the atmosphere, air was used.

5.3.2. Evaluation of Calcined Body

Subsequently, with respect to the produced calcined bodies, a bending load was measured using a three-point bending test jig. Then, the bending stress σ of the calcined body was calculated according to the following formula.

$$\sigma = \frac{3FL}{2bh^2}$$

In the above formula, F represents the bending load, L represents the distance between the fulcrums of the three-point bending test jig, b represents the width of the calcined body, and h represents the thickness of the calcined body.

Subsequently, when the bending stress calculated for the calcined body of Sample No. 1 was assumed to be 1, the relative value of the bending stress for each of the calcined bodies of respective Sample Nos. was calculated. Then, the calculated relative value was evaluated according to the following evaluation criteria.

A: The relative value of the bending stress is more than 1.20.
B: The relative value of the bending stress is more than 1.15 and 1.20 or less.
C: The relative value of the bending stress is more than 1.10 and 1.15 or less.
D: The relative value of the bending stress is more than 1.05 and 1.10 or less.
E: The relative value of the bending stress is more than 1.00 and 1.05 or less.
F: The relative value of the bending stress is 1.00 or less.

The evaluation results are shown in Tables 1 to 4.

5.3. Evaluation Results

The evaluation results for the powders for additive manufacturing and the calcined bodies are shown in Tables 1 to 4.

TABLE 1

(phenyl group)

| Sample No. | Example/ Comparative Example | Production conditions of powder for additive manufacturing: Average particle diameter R (μm) | Coupling agent: Reactive functional group | Hydrolyzable group | Substance name | Carbon concentration (mass %) | A | Carbon concentration (mass %) |
|---|---|---|---|---|---|---|---|---|
| 1 | Comparative Example | 10.0 | — | — | — | 0.00 A | 1.00 | 0.00 |
| 2 | Comparative Example | 10.0 | phenyl group | trimethoxy group | a-1 | 0.05 A | 1.00 | 0.05 |
| 3 | Example | 10.0 | phenyl group | trimethoxy group | a-1 | 0.07 A | 1.00 | 0.07 |
| 4 | Example | 10.0 | phenyl group | trimethoxy group | a-1 | 0.09 A | 1.00 | 0.08 |
| 5 | Example | 10.0 | phenyl group | trimethoxy group | a-1 | 0.11 A | 1.00 | 0.11 |
| 6 | Example | 10.0 | phenyl group | trimethoxy group | a-1 | 0.13 A | 1.00 | 0.13 |
| 7 | Example | 10.0 | phenyl group | trimethoxy group | a-1 | 0.15 A | 1.00 | 0.15 |
| 8 | Example | 10.0 | phenyl group | trimethoxy group | a-1 | 0.17 A | 1.00 | 0.27 |
| 9 | Example | 10.0 | phenyl group | trimethoxy group | a-1 | 0.25 A | 1.00 | 0.25 |
| 10 | Comparative Example | 10.0 | phenyl group | trimethoxy group | a-1 | 0.32 A | 1.00 | 0.32 |
| 11 | Example | 10.0 | phenyl group | trimethoxy group | a-2 | 0.10 A | 1.00 | 0.18 |
| 12 | Example | 4.0 | phenyl group | trimethoxy group | a-1 | 0.15 A | 2.50 | 0.38 |
| 13 | Example | 15.0 | phenyl group | trimethoxy group | a-1 | 0.08 A | 0.67 | 0.05 |
| 14 | Example | 12.0 | diphenyl group | dimethoxy group | a-3 | 0.12 A | 0.53 | 0.20 |
| 15 | Comparative Example | 10.0 | methyl group (non-reactive) | trimethoxy group | x-1 | 0.08 A | 1.00 | 0.00 |

(phenyl group)

| Sample No. | Evaluation results of powder for additive manufacturing: Bulk density ($g/cm^3$) | Ratio of bulk density to true density (%) | Tap density ($g/cm^3$) | Ratio of tap density to true density [%] | Strength of calcined body: Vinyl-based resin | Unsaturated polyester-based resin | Phenolic resin |
|---|---|---|---|---|---|---|---|
| 1 | 3.01 | 39 | 4.25 | 55 | F | F | F |
| 2 | 3.30 | 42 | 4.44 | 57 | D | D | D |
| 3 | 3.40 | 44 | 4.85 | 62 | C | C | C |
| 4 | 3.46 | 44 | 4.82 | 62 | B | B | B |
| 5 | 3.53 | 45 | 4.72 | 61 | A | A | A |
| 6 | 3.58 | 46 | 4.79 | 62 | A | A | A |
| 7 | 3.52 | 45 | 4.75 | 61 | A | A | A |
| 8 | 3.36 | 43 | 4.54 | 58 | B | B | B |
| 9 | 3.10 | 40 | 4.40 | 57 | C | C | C |
| 10 | 3.05 | 39 | 4.24 | 54 | D | D | D |
| 11 | 3.33 | 43 | 4.51 | 58 | C | C | C |

TABLE 1-continued

| | | | | | | | |
|---|---|---|---|---|---|---|---|
| 12 | 3.48 | 45 | 4.70 | 60 | A | A | A |
| 13 | 3.50 | 45 | 4.73 | 61 | B | B | B |
| 14 | 3.26 | 42 | 4.45 | 57 | C | C | C |
| 15 | 3.31 | 43 | 4.40 | 57 | E | E | E |

TABLE 2

(vinyl group)

| Sample No. | Example/ Comparative Example | Production conditions of powder for additive manufacturing: Average particle diameter R (μm) | Coupling agent: Reactive functional group | Hydrolyzable group | Substance name | Carbon concentration (mass %) | A | Carbon concentration (mass %) |
|---|---|---|---|---|---|---|---|---|
| 1 | Comparative Example | 10.0 | — | — | — | 0.00 A | 1.00 | 0.00 |
| 16 | Comparative Example | 10.0 | vinyl group | trimethoxy group | b-1 | 0.01 A | 1.00 | 0.01 |
| 17 | Example | 10.0 | vinyl group | trimethoxy group | b-1 | 0.08 A | 1.00 | 0.03 |
| 18 | Example | 10.0 | vinyl group | trimethoxy group | b-1 | 0.05 A | 1.00 | 0.05 |
| 19 | Example | 10.0 | vinyl group | trimethoxy group | b-1 | 0.07 A | 1.00 | 0.07 |
| 20 | Example | 10.0 | vinyl group | trimethoxy group | b-1 | 0.09 A | 1.00 | 0.09 |
| 21 | Comparative Example | 10.0 | vinyl group | trimethoxy group | b-1 | 0.12 A | 1.00 | 0.12 |
| 22 | Examle | 10.0 | vinyl group | trimethoxy group | b-2 | 0.06 A | 1.00 | 0.06 |
| 23 | Example | 4.0 | vinyl group | trimethoxy group | b-2 | 0.05 A | 2.50 | 0.13 |
| 24 | Example | 15.0 | vinyl group | trimethoxy group | b-1 | 0.08 A | 0.67 | 0.05 |
| 15 | Comparative Example | 10.0 | methyl group (non-reactive) | trimethoxy group | x-1 | 0.08 A | 1.06 | 0.08 |

(vinyl group)

| Sample No. | Evaluation results of powder for additive manufacturing: Bulk density (g/cm$^3$) | Ratio of bulk density to true density (%) | Tap density (g/cm$^3$) | Ratio of tap density to true density [%] | Strength of calcined body: Vinyl-based resin | Unsaturated polyester-based resin |
|---|---|---|---|---|---|---|
| 1 | 3.01 | 39 | 4.25 | 55 | F | F |
| 16 | 3.20 | 41 | 4.31 | 55 | D | D |
| 17 | 3.30 | 42 | 4.70 | 80 | B | C |
| 18 | 3.35 | 43 | 4.68 | 60 | A | B |
| 19 | 3.42 | 44 | 4.68 | 69 | A | A |
| 20 | 3.47 | 45 | 4.65 | 60 | A | A |
| 21 | 2.96 | 38 | 4.11 | 63 | D | D |
| 22 | 3.23 | 42 | 4.37 | 56 | B | C |
| 23 | 3.38 | 43 | 4.86 | 89 | A | A |
| 24 | 3.40 | 44 | 4.59 | 88 | A | B |
| 15 | 3.81 | 43 | 4.40 | 57 | E | E |

TABLE 3

(epoxy group)

| Sample No. | Example/ Comparative Example | Production conditions of powder for additive manufacturing: Average particle diameter R (μm) | Coupling agent: Reactive functional group | Hydrolyzable group | Substance name | Carbon concentration (mass %) | A | Carbon concentration (mass %) |
|---|---|---|---|---|---|---|---|---|
| 1 | Comparative Example | 10.0 | — | — | — | 0.00 A | 1.00 | 0.00 |
| 25 | Comparative Example | 10.0 | epoxy group | trimethoxy group | c-1 | 0.00 A | 1.00 | 0.05 |
| 26 | Example | 10.0 | epoxy group | trimethoxy group | c-1 | 0.07 A | 1.00 | 0.07 |
| 27 | Example | 10.0 | epoxy group | trimethoxy group | c-1 | 0.09 A | 1.00 | 0.09 |
| 28 | Example | 10.0 | epoxy group | trimethoxy group | c-1 | 0.11 A | 1.00 | 0.11 |
| 29 | Example | 10.0 | epoxy group | trimethoxy group | c-1 | 0.13 A | 1.00 | 0.13 |
| 30 | Example | 10.0 | epoxy group | trimethoxy group | c-1 | 0.15 A | 1.00 | 0.15 |
| 31 | Example | 10.0 | epoxy group | trimethoxy group | c-1 | 0.17 A | 1.00 | 0.17 |
| 32 | Example | 10.0 | epoxy group | trimethoxy group | c-1 | 0.25 A | 1.00 | 0.25 |
| 33 | Comparative Example | 10.0 | epoxy group | trimethoxy group | c-1 | 0.32 A | 1.00 | 0.32 |
| 34 | Example | 10.0 | epoxy group | trimethoxy group | c-1 | 0.10 A | 1.00 | 0.10 |
| 35 | Example | 4.0 | epoxy group | trimethoxy group | c-1 | 0.15 A | 2.50 | 0.38 |
| 36 | Example | 15.0 | epoxy group | trimethoxy group | c-1 | 0.08 A | 0.67 | 0.06 |
| 15 | Comparative Example | 10.0 | methyl group (non-reactive) | trimethoxy group | x-1 | 0.08 A | 1.00 | 0.08 |

(epoxy group)

| Sample No. | Evaluation results of powder for additive manufacturing: Bulk density (g/cm$^3$) | Ratio of bulk density to true density (%) | Tap density (g/cm$^3$) | Ratio of tap density to true density [%] | Strength of calcined body: Urethane-based resin | Epoxy-based resin | Unsaturated polyester-based resin | Phenolic resin |
|---|---|---|---|---|---|---|---|---|
| 1 | 3.01 | 39 | 4.25 | 55 | F | F | F | F |
| 25 | 3.27 | 42 | 4.40 | 56 | D | D | D | D |
| 26 | 3.37 | 43 | 4.80 | 62 | C | B | C | B |
| 27 | 3.42 | 44 | 4.77 | 61 | B | A | B | A |
| 28 | 3.49 | 45 | 4.67 | 60 | A | A | .A | A |
| 29 | 3.54 | 46 | 4.74 | 61 | A | A | A | A |
| 30 | 3.48 | 45 | 4.70 | 60 | A | A | A | A |
| 31 | 3.32 | 48 | 4.49 | 58 | B | B | A | B |
| 32 | 3.07 | 39 | 4.36 | 56 | C | B | C | B |
| 33 | 3.02 | 39 | 4.20 | 54 | D | D | D | D |
| 34 | 3.30 | 42 | 4.46 | 57 | C | B | C | B |
| 35 | 3.45 | 44 | 4.65 | 60 | A | A | A | A |
| 36 | 3.47 | 45 | 4.68 | 60 | B | A | B | A |
| 15 | 3.31 | 43 | 4.40 | 57 | E | E | E | E |

TABLE 4

(amino group)

| Sample No. | Example/ Comparative Example | Average particle diameter R (μm) | Coupling agent: Reactive functional group | Hydrolyzable group | Substance name | Carbon concentration (mass %) | A | Carbon concentration (mass %) |
|---|---|---|---|---|---|---|---|---|
| | | Production conditions of powder for additive manufacturing | | | | | | |
| 1 | Comparative Example | 10.0 | — | — | — | 0.00 A | 1.00 | 0.00 |
| 37 | Comparative Example | 10.0 | amino group | trimethoxy group | d-1 | 0.05 A | 1.00 | 0.05 |
| 38 | Example | 10.0 | amino group | trimethoxy group | d-1 | 0.07 A | 1.00 | 0.07 |
| 39 | Example | 10.0 | amino group | trimethoxy group | d-1 | 0.09 A | 1.00 | 0.09 |
| 40 | Example | 10.0 | amino group | trimethoxy group | d-1 | 0.11 A | 1.00 | 0.11 |
| 41 | Example | 10.0 | amino group | trimethoxy group | d-1 | 0.13 A | 1.00 | 0.13 |
| 42 | Comparative Example | 10.0 | amino group | trimethoxy group | d-1 | 0.16 A | 1.00 | 0.16 |
| 43 | Example | 10.0 | amino group | trimethoxy group | d-1 | 0.10 A | 1.00 | 0.10 |
| 44 | Example | 4.0 | amino group | trimethoxy group | d-1 | 0.10 A | 2.50 | 0.25 |
| 45 | Example | 15.0 | amino group | trimethoxy group | d-1 | 0.08 A | 0.67 | 0.05 |
| 15 | Comparative Example | 10.0 | methyl group (non-reactive) | trimethoxy group | x-1 | 0.08 A | 1.00 | 0.08 |

(amino group)

| Sample No. | Evaluation results of powder for additive manufacturing: Bulk density (g/cm$^3$) | Ratio of bulk density to true density (%) | Tap density (g/cm$^3$) | Ratio of tap density to true density [%] | Strength of calcined body: Urethane-based resin | Epoxy-based resin | Phenolic resin |
|---|---|---|---|---|---|---|---|
| 1 | 3.01 | 39 | 4.25 | 55 | F | F | F |
| 37 | 3.17 | 41 | 4.26 | 55 | D | D | D |
| 38 | 3.26 | 42 | 4.66 | 60 | C | B | B |
| 39 | 3.31 | 43 | 4.63 | 59 | B | A | A |
| 40 | 3.39 | 44 | 4.53 | 58 | A | A | A |
| 41 | 3.44 | 44 | 4.60 | 59 | A | A | A |
| 42 | 2.93 | 38 | 4.07 | 52 | D | D | D |
| 43 | 3.20 | 41 | 4.33 | 56 | C | B | B |
| 44 | 3.34 | 43 | 4.51 | 58 | B | A | B |
| 45 | 3.36 | 43 | 4.54 | 58 | B | A | A |
| 15 | 3.31 | 43 | 4.40 | 57 | E | E | E |

As shown in Tables 1 to 4, it was confirmed that the powders for additive manufacturing corresponding to Example have a sufficiently high ratio of the bulk density to the true density and a sufficiently high ratio of the tap density to the true density. This proved that the powders for additive manufacturing corresponding to Example exhibit good fillability when being leveled with a coater or the like, and contribute to the formation of a dense powder layer.

Further, as shown in Tables 1 to 4, by using the powders for additive manufacturing corresponding to Example, it was possible to increase the strength of the calcined bodies of the additively manufactured bodies produced by a binder jet method. In addition, in these calcined bodies, the occurrence of deformation, cracking, or the like was also not observed.

Subsequently, the obtained calcined body was sintered in a sintering furnace. The sintering conditions were set to 1300° C.×3 hours in an argon atmosphere. By doing this, a metal sintered body was obtained. The metal sintered body produced using the powder for additive manufacturing corresponding to Example had high dimensional accuracy in the target shape, and also had a high mechanical strength. The above results proved that the present disclosure has such effects.

The calculated bending stress is a stress at fracture, and therefore corresponds to the bending strength of the calcined body. The calcined bodies produced using the powders for additive manufacturing corresponding to Example all had a bending strength of 0.4 MPa or more. In particular, the calcined bodies evaluated as B or higher according to the above evaluation criteria had a bending strength of 0.6 MPa or more.

When the mechanical strength was evaluated also for the additively manufactured bodies before performing calcination, in the additively manufactured bodies produced using the powders for additive manufacturing corresponding to Example, a tendency similar to the evaluation results of the calcined bodies described above was observed. From the results, it is considered that the fillability of the metal powder in the additively manufactured body contributes to the mechanical strength and shape retainability of the calcined body.

Figure 14:
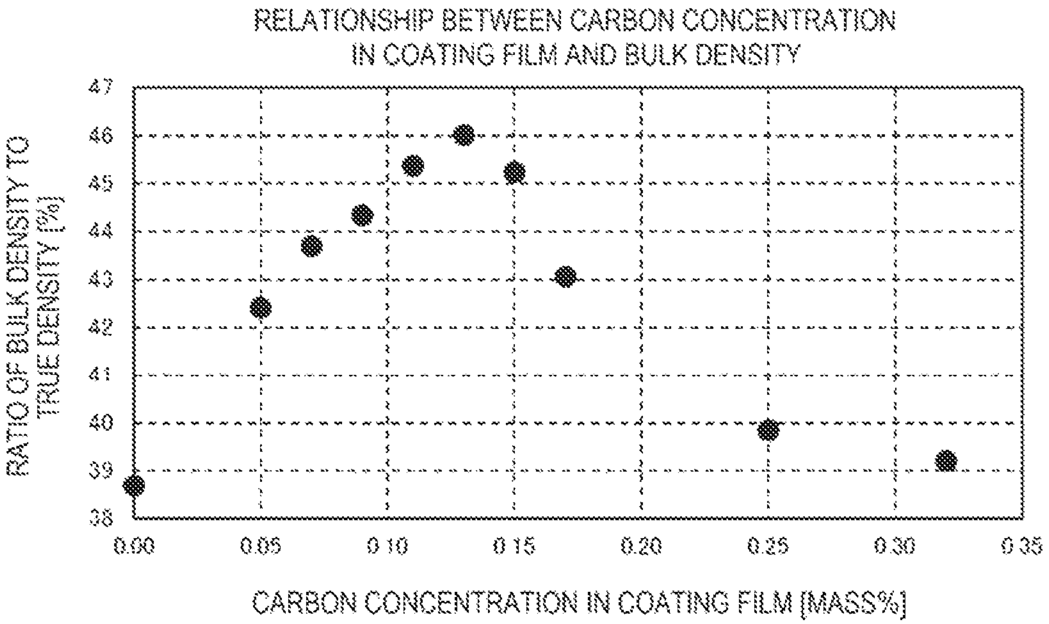
FIG. 14 is a graph showing a relationship between the carbon concentration in a coating film and the bulk density of a powder for additive manufacturing.
Figure 15:
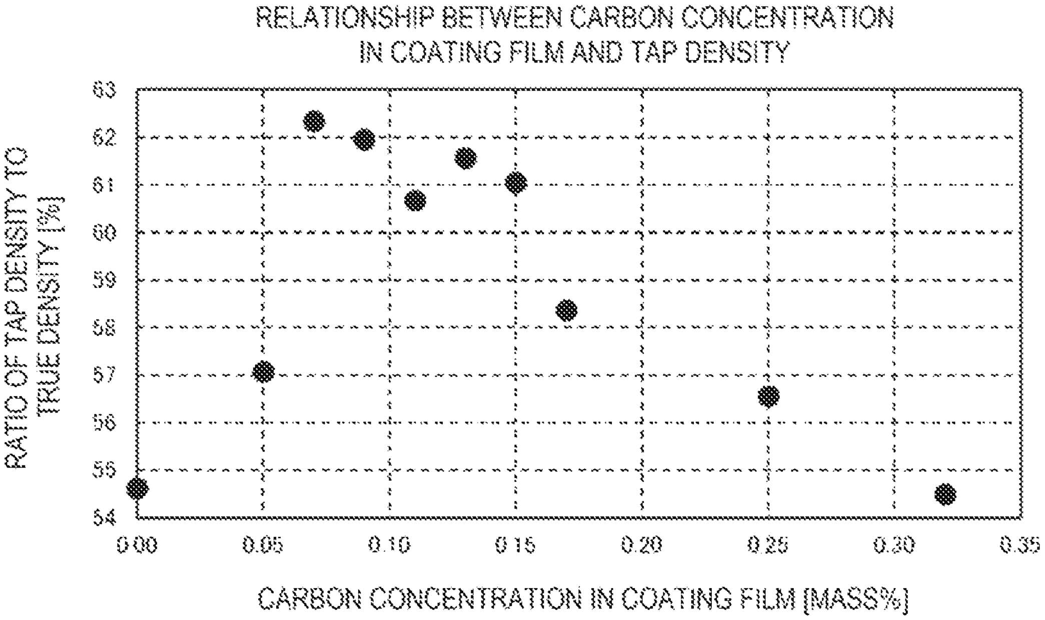
FIG. 15 is a graph showing a relationship between the carbon concentration in a coating film and the tap density of a powder for additive manufacturing.

FIG. 14 is a graph showing a relationship between the carbon concentration in the coating film and the bulk density of the powder for additive manufacturing. FIG. 15 is a graph showing a relationship between the carbon concentration in the coating film and the tap density of the powder for additive manufacturing. The data used in FIGS. 14 and 15 are data of Sample Nos. 1 to 10.

As shown in FIGS. 14 and 15, it was found that by optimizing the carbon concentration in the coating film, the bulk density and the tap density can be increased. Then, it was confirmed that by using the powder for additive manufacturing having a high bulk density and a high tap density, the strength of the calcined body can be increased.

What is claimed is:

1. A powder for additive manufacturing, which is a powder for additive manufacturing to be used in a binder jet additive manufacturing method, comprising:

a metal powder; and a coating film that is provided at surfaces of particles of the metal powder by hydrolysis and that contains a compound derived from a coupling agent having a reactive functional group, wherein the reactive functional group is a vinyl group, when an average particle diameter is represented by R [μm], and $(R/10)^2/(R/10)^3$ is represented by A, the coating film has a carbon concentration of 0.02 A mass % or more and 0.10 A mass % or less, the average particle diameter of the metal powder is 5.0 microns or more and 10.0 microns or less, an average thickness of the coating film is 0.5 nm or more and 50 nm or less, and wherein with respect to the true density of the metal powder, the bulk density is 41% or more and 48% or less, and the tap density is 55% or more and 65% or less.

2. The powder for additive manufacturing according to claim 1, wherein the coating film is a monomolecular film of the compound.

3. A method for producing a metal sintered body, comprising:

forming a powder layer by spreading the powder for additive manufacturing according to claim 1;

obtaining a bound layer by supplying a binder solution containing a binder to the powder layer to bind particles of the powder for additive manufacturing with the binder;

obtaining an additively manufactured body by repeating forming the powder layer and obtaining the bound layer one or more times; and obtaining a metal sintered body by subjecting the additively manufactured body to a sintering treatment.

4. The method for producing a metal sintered body according to claim 3, wherein the reactive functional group is a vinyl group, the carbon concentration is 0.02 A mass % or more and 0.10 A mass % or less, and the binder contains a vinyl-based resin or an unsaturated polyester-based resin.

5. The method for producing a metal sintered body according to claim 3, wherein when the additively manufactured body is calcined in an air atmosphere at a temperature of 200° C. for 30 minutes, the resulting calcined body has a bending strength of 0.4 MPa (40 $N/cm^2$) or more.

* * * * *